United States Patent
Rahim et al.

(10) Patent No.: US 9,126,353 B2
(45) Date of Patent: Sep. 8, 2015

(54) METHOD AND APPARATUS FOR MAKING POLYOLEFIN PELLETS

(75) Inventors: Waseem Rahim, League City, TX (US); Robert Sander, League City, TX (US); John Yanosik, League City, TX (US)

(73) Assignee: INEOS OLEFINS & POLYMERS USA, League City, TX (US)

( * ) Notice: Subject to any disclaimer, the term of this patent is extended or adjusted under 35 U.S.C. 154(b) by 630 days.

(21) Appl. No.: 12/938,881

(22) Filed: Nov. 3, 2010

(65) Prior Publication Data

US 2012/0104664 A1 May 3, 2012

(51) Int. Cl.
| | |
|---|---|
| *B29B 7/46* | (2006.01) |
| *B29C 71/00* | (2006.01) |
| *C08J 3/12* | (2006.01) |
| *B29C 47/60* | (2006.01) |
| *B29C 47/36* | (2006.01) |
| *B29B 9/16* | (2006.01) |
| *B29C 47/00* | (2006.01) |
| *B29C 47/10* | (2006.01) |
| *B29C 47/82* | (2006.01) |

(52) U.S. Cl.
CPC . *B29B 7/465* (2013.01); *B29B 9/16* (2013.01); *B29C 47/366* (2013.01); *B29C 47/6018* (2013.01); *B29C 71/009* (2013.01); *C08J 3/124* (2013.01); *B29B 2009/166* (2013.01); *B29B 2009/168* (2013.01); *B29C 47/0023* (2013.01); *B29C 47/1018* (2013.01); *B29C 47/82* (2013.01)

(58) Field of Classification Search
None
See application file for complete search history.

(56) References Cited

U.S. PATENT DOCUMENTS

| | | | | |
|---|---|---|---|---|
| 4,252,968 | A * | 2/1981 | Govoni et al. | 528/483 |
| 4,372,758 | A * | 2/1983 | Bobst et al. | 528/483 |
| 4,758,654 | A * | 7/1988 | Brod et al. | 528/483 |
| 4,820,463 | A * | 4/1989 | Raufast | 264/68 |
| 5,703,203 | A * | 12/1997 | Fezza et al. | 528/483 |
| 5,799,412 | A * | 9/1998 | Yamamoto et al. | 34/582 |
| 5,852,116 | A * | 12/1998 | Cree et al. | 525/72 |
| 6,551,563 | B1 * | 4/2003 | Kado et al. | 422/186.21 |
| 7,232,878 | B2 * | 6/2007 | Mulgrew et al. | 528/480 |
| 2004/0132964 | A1 * | 7/2004 | Mulgrew et al. | 528/481 |

(Continued)

FOREIGN PATENT DOCUMENTS

| | | |
|---|---|---|
| EP | 1591457 A1 | 11/2005 |
| GB | 1272778 | 5/1972 |
| WO | WO 02/088194 A1 | 11/2002 |
| WO | WO 2004/039848 A1 | 5/2004 |

OTHER PUBLICATIONS

INEOS—Typical Engineering Properties of High Density Polyethylene.*

(Continued)

*Primary Examiner* — Jeffrey Wollschlager
(74) *Attorney, Agent, or Firm* — Finnegan, Henderson, Farabow, Garrett & Dunner, LLP (57) ABSTRACT

This disclosure relates to pelletized polyolefin resins. More particularly, the disclosure relates to a process that allows for adjustment of certain desired properties of either the resin, such as modification of the bulk density of resin pellets, or adjustment of properties for the articles made from the resin, such as improved odor and taste properties, when used as a bottle cap, for example, or tailoring of the resin volatile or wax level, when used to make pipe, for example. This disclosure also relates to a system for making pelletized resins, such as mono-modal or multi-modal olefin polymer resins.

14 Claims, 3 Drawing Sheets

(56) References Cited

U.S. PATENT DOCUMENTS

| | | | |
|---|---|---|---|
| 2005/0049343 A1* | 3/2005 | Borke et al. | 524/366 |
| 2006/0034777 A1* | 2/2006 | Mahling et al. | 424/46 |
| 2006/0111575 A1* | 5/2006 | DeCourcy et al. | 549/248 |
| 2006/0217528 A1* | 9/2006 | Cousin et al. | 528/480 |
| 2008/0045683 A1* | 2/2008 | Perna et al. | 526/279 |
| 2008/0051538 A1* | 2/2008 | Coffy et al. | 526/170 |

OTHER PUBLICATIONS

Silon Taborex TA 1135 HD Datasheet.*
Silon Taborex TA 1133 HD Datasheet.*
International Search Report and Written Opinion mailed Jul. 25, 2011 in corresponding PCT Application No. PCT/US2010/055287.

\* cited by examiner

METHOD AND APPARATUS FOR MAKING POLYOLEFIN PELLETS

This disclosure relates to pelletized polyolefin resins. More particularly, the disclosure relates to a process that allows for adjustment of certain desired properties of either the resin, such as modification of the bulk density of resin pellets, or adjustment of properties for the articles made from the resin, such as improved odor and taste properties, when used as a bottle cap, for example, or tailoring of the resin volatile or wax level, when used to make pipe, for example. This disclosure also relates to a system for making pelletized resins, such as mono-modal or multi-modal olefin polymer resins.

There are several benefits associated with the pellets made according to the disclosed description, such as the ability to ship the pellet product at a lower cost. Some methods of bulk shipment, such as rail, are priced based on the cost per shipping container such as a railcar. In these cases an ability to increase the pellet bulk density allows the producer to ship a higher mass of pellets in the same size container or railcar, lowering the shipping cost on a mass basis.

Another benefit is with respect to a pipe resin application, such as the treatment of a high density polyethylene pelletized resin for use in making pipes. The pipe making process is sensitive to the bulk density of the pellets used to make the pipes. The extruders used to make pipes utilize a design feature called grooved feed extruders. These extruders have grooves cut into them that enhances their behavior and increases their throughput rate. These types of extruders are especially prevalent in the large diameter pipe market. If the pellets that are fed to these types of extruders are not the proper balance of shape, size, and bulk density, the result is lower throughput rate and lower quality pipe. This is because a desired pellet bulk density is necessary to maintain stable pellet flow feeding into the extruder and desired production rates, allowing for a consistent and acceptable extrusion rate.

A consistent and desired extrusion rate is important to high-quality, economical pipe/profile manufacturing. Excessive extrusion variability can increase manufacturing cost for the pipe producer due to nonconforming product (outside required dimensional tolerance) and increased material consumption (to maintain minimum wall thickness). Lower bulk density can have an impact on lowering production rates by as much as 20 percent. Hence, for the manufacturer of polyethylene pellets for the pipe producer, at least one aspect that is important is for the pellets to have a desired bulk density.

In one aspect, this disclosure provides a method of making pellets of desired bulk density to make the pipe process extruders and other processing equipment work as they are designed. Current methods of adjusting the bulk density of pellets include adjusting the pelletizing conditions at an extruder. Typically this involves changing the length of the pellets. The pellet geometry is important for some resins to improve the bulk density. Secondly, the pellet water temperature for underwater pelletizers can be important influences on bulk density. Thirdly, the die plate design can be adjusted to affect pellet shape and thus bulk density. However, none of these alternative methods can achieve the level of bulk density that the disclosed process achieves.

Therefore, there remains a need for a method that is capable of modifying the bulk density of a pelletized resin, such as mono-modal or multi-modal (such as bimodal) olefin polymer resin, and that does not adversely effect size or geometry of the pellet. In one aspect, the Inventors have discovered a method of making pellets comprising mono-modal or multi-modal olefin polymer resin that achieves an increase in bulk density without changing the appearance of the pellets. In another aspect, there is disclosed a method of making pellets comprising mono-modal or multi-modal olefin polymer resin with increased bulk density having improved color, smell, and/or taste. Systems comprising the above are also disclosed.

Another benefit is with respect to the ability to modify the profile or amount of organic materials in the resin, such as the level of waxes, oligomers, or volatiles in the resin based upon the desirable characteristics of the article that is made from the resin. As described in prior art, resins often contain small levels of compounds such as volatiles, oligomers, and waxes. In some applications having a certain level of these compounds can be beneficial, such as in the manufacturing of film products. In other applications it is beneficial to remove compounds in the resin, such as waxes, oligomers, volatiles, unreacted monomer, oxidation byproducts produced, to a level below the baseline amount. An example would be an article that needs a low taste or odor profile such as an article that comes into contact with food, or drinks, such as water. Non-limiting examples of such articles include a bottle, a film, a pipe, a cap or a closure. Based upon the needs of the final article, this invention allows the resin manufacturer the ability to selectively tailor the final level of these compounds in the resin by adjusting operating conditions within this novel process.

SUMMARY

Therefore, there are provided herein methods of making a pelletized polyolefin resin comprising:
 introducing pellets comprising polyolefins to a holding vessel;
 heating the pellets in the holding vessel to a hold temperature at or below the softening point of the polyolefins;
 maintaining the pellets at the hold temperature;
 purging the holding vessel of volatile materials; and
 treating the purged volatile materials by exposing them to at least one thermal destruction process,
 wherein the pellets are heated to the hold temperature for a time sufficient to modify at least one of the following:
  the level of organic materials other than the polyolefins originally present in the resin; or
  the bulk density of the pellets, such as increasing the bulk density.

In one embodiment, modifying the level of organic materials other than the polyolefin means to decrease the amount of other organic materials present, such as organic materials chosen from waxes, oligomers, and volatile materials, or other organic materials which are otherwise inherently present in the polyolefin or those which are difficult to quantify and/or elucidate using standard industrial means.

However, in other embodiments, such as when the resin is subsequently used as a film, the organic materials may be maintained or modified, such as decreased to a level sufficient to allow the resin to be further processed by at least one film-forming process.

It is appreciated that when the resin is to be used in an article that will come into contact with food or water, the organic materials are adjusted to a level sufficient to decrease or eliminate the taste and/or odor of the resin. In this embodiment, the method further comprises at least one processing step to form the resin into an article that will come into contact with food or water, such as a cap, closure, bottle, film, pipe or container.

There are also disclosed methods of making a pelletized polyolefin resin tailored to the needs of specific applications, such as caps and closures, films, bottles, pipes, and containers. Such methods may comprise:

introducing pellets of polyolefin to a holding vessel, wherein the pellets have an initial bulk density ($d_i$) when measured at $T_{ref}$;

heating the pellets in the holding vessel to a hold temperature, specified by the needs of the application, at or below the softening point of the polyolefin;

maintaining the pellets at the hold temperature for a specified time, dictated by the needs of the application, sufficient to remove at least one monomer, volatile, oligomer, or wax from the pellets, wherein the at least one monomer, volatile, oligomer or wax removed from the pellets form volatile materials in the holding vessel, wherein the pellets have a final bulk density ($d_f$), such tha $d_f \geq d_i$; when measured at $T_{ref}$;

purging the holding vessel of the volatile materials; and treating the purged volatile materials by exposing them to at least one thermal destruction process, such as a flare or thermal oxidizer.

The processes described herein can be used to remove low molecular weight hydrocarbons from a polyolefin polymer for any of several end uses. For instance, this process is used to treat bimodal polyethylene pipe resins to remove smoky hydrocarbons that cause difficulty in pipe manufacture. It is also used to improve the organoleptic properties of polyolefins used in potable water or food contact applications.

In another aspect, the invention provides a system for making pelletized resin. In a further aspect, the pelletized resin described herein, have improved properties such as increased bulk density, reduction of volatiles, including oligomers or monomers, which leads to a corresponding improvement in odor and/or taste, when used in applications that come into contact with potable water, such as drinking container or caps, water pipes, and the like. Other properties that would be advantageous or commercial suitable will also become apparent from the following disclosure.

In many cases, local environmental considerations make it necessary to process and treat the purged gas (from the purging step) due to the presence of oligomers or small amounts of residual hydrocarbons. Thus, it has been discovered that these unwanted volatile materials can be appropriately processed when the system further comprises a thermal destruction device, such as a flare or a thermal oxidizer.

The foregoing and other features of the present disclosure will be more readily apparent from the following detailed description of exemplary embodiments, taken in conjunction with the attached drawings. It will be noted that for convenience all illustrations of devices show the height dimension exaggerated in relation to the width.

DETAILED DESCRIPTION

As previously stated, there are disclosed methods of making a pelletized polyolefin resin, tailored to the needs of specific applications, such as caps and closures, film, bottles, pipe, and containers, comprising: introducing pellets comprising polyolefins to a holding vessel;

heating the pellets in the holding vessel to a hold temperature at or below the softening point of the polyolefins;

maintaining the pellets at the hold temperature;

purging the holding vessel of volatile materials; and treating the purged volatile materials by exposing them to at least one thermal destruction process, wherein the pellets are heated to the temperature for a time sufficient to modify at least one of the following:

the level of organic materials other than the polyolefins originally present in the resin; or the bulk density of the pellets, such as increasing the bulk density.

In one embodiment, the process comprises introducing pellets of polyolefin to a holding vessel, wherein the pellets have an initial bulk density ($d_i$) when measured at $T_{ref}$;

heating the pellets in the holding vessel to a hold temperature, specified by the needs of the final application, at or below the softening point of the polyolefin;

maintaining the pellets at the hold temperature for a hold time, specified by the needs of the application, sufficient to remove at least one monomer or oligomer from the pellets, wherein the at least one monomer or oligomer removed from the pellets form volatile materials in the holding vessel, wherein the pellets have a final bulk density ($d_f$), such that $d_f \geq d_i$; when measured at $T_{ref}$;

purging the holding vessel of the volatile materials; and treating the purged volatile materials by exposing them to at least one thermal destruction process.

In one embodiment, the pellets are introduced to the holding vessel and pre-heated prior to entering the holding vessel, such as to a temperature ranging from 140-330° F., or 140-265° F., or even at a temperature ranging from 140-160° F. In one embodiment, the pellets are extruded prior to being introduced into the pre-heater and holding vessel.

In one embodiment, the pellets comprise at least one monomodal or multi-modal olefin polymer, such as, ethylene, propylene, methylpentene, hexene-1, and butene-1. In another embodiment, the olefin polymer is bimodal.

Upon entering the holding vessel, the pellets are heated in the holding vessel to a temperature ranging from 140-330° F., 140-265° F., or 140-160° F., for a time that would be sufficient to remove at least one monomer or oligomer from the pellets. This time may range from 4-18 hours, such as from 5-15 hours, or even from 8-12 hours.

It is to be appreciated that the pellets may remain in the holding vessel described above only until they reach the desired temperature that would be sufficient to remove at least one monomer or oligomer from the pellets. As used herein, an oligomer is defined as a molecule that contains between one to nine monomer units, generally formed as a byproduct during a reaction to make polyolefins from monomer. In some embodiments, oligomers containing $C_6$-$C_{10}$ can be removed from the pellets, while in other embodiments, the testing and removal of oligomers containing $C_2$-$C_8$ is contemplated. In general, a method according to one embodiment of the present disclosure focuses on oligomers up to $C_{18}$, which would correlate to nine ethylene monomers in the case of PE, for example.

At this point, the pellets can be transferred to a separate degasser vessel. However, in an alternative embodiment, the pellet heating and degassing may be carried out in the same vessel. Both embodiments are encompassed by this disclosure.

After maintaining the pellets in the holding vessel for the time described above, the pellets are optionally cooled to a temperature below the hold temperature, such as to room temperature. In one embodiment, the optional cooling is performed using a gas purge or cool water exchanger.

Upon cooling, an increase in bulk density of the pellets may also be realized. For example, in one embodiment, the pellets introduced to the holding vessel have an initial bulk density ($d_1$) of less than 37 lb/ft³, such as about 35-36 lb/ft³, but exhibit a final bulk density ($d_f$) of 37 lb/ft³ or greater, such as about 37.5 lb/ft³ after cooling to room temperature. In one embodiment, the cooled pellets have an average nominal diameter ranging from 0.05 to 0.35 inches.

In one embodiment, treating the purged volatile materials is carried out by exposing the volatile materials to at least one thermal destruction process, such as by passing the volatile materials through a flare or thermal oxidizer.

As described above, the cooling step may be avoided if the pellets are subjected to additional processing, such as to make an article, prior to cooling. For example, if the heat-treated pellets are further processed into an article, such as extrusion, thermoforming, blow molding or injection, or rotomolding, the pellets need not be cooled to room temperature prior to entering the additional processing apparatus, whether it is an extruder, forming or molding device.

Non-limiting examples of articles that can be made according to the methods described herein include pipes, containers, films, and caps, such as for bottles, and other closure devices. The container may be, or comprise, for example, a bottle.

In one embodiment, purging of the holding vessel is carried out with air, fuel gas, or a non hydrocarbon gas, such as, for example, nitrogen.

Also disclosed is a system for making a pelletized resin having improved properties, such as an increased bulk density. In one embodiment, the system comprises:

(a) an apparatus for introducing resin pellets into a vessel;
(b) a vessel for heating the pellets to the softening temperature of the resin, the vessel containing at least one port for removing volatile materials generated from the pellets during heating; and
(c) a holding vessel for maintaining the pellets at the temperature for a specified period of time, wherein the holding vessel contains at least one port for removing volatile materials generated from the pellets during heating; and
(d) a cooling vessel for cooling said pellets below said hold temperature, wherein said system further comprises a thermal oxidizer connected to at least one port of said holding vessel.

Figure 1:
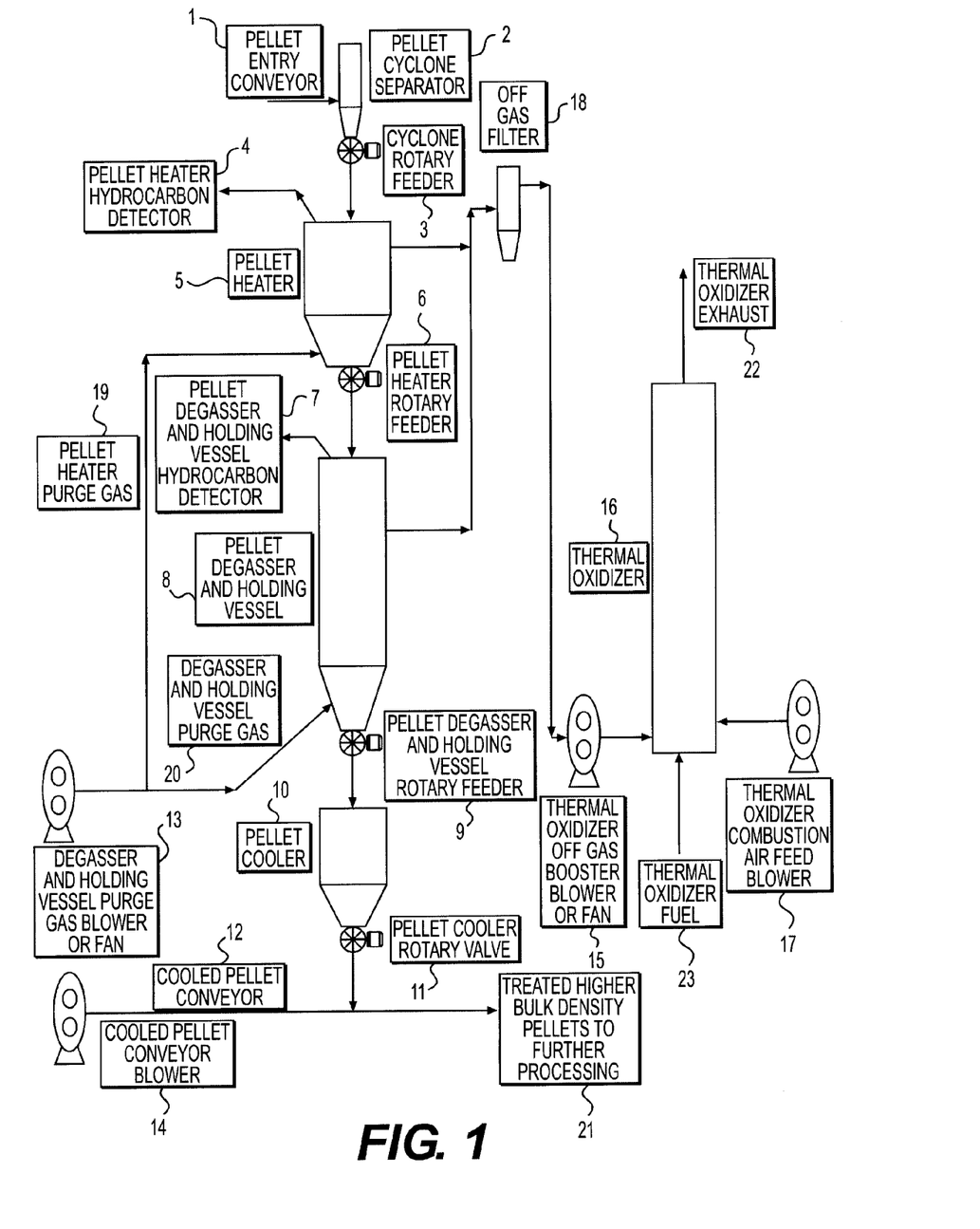
FIG. 1 is a schematic of one representative system according to the present disclosure.

With reference to FIG. 1, one system made according to the present disclosure may include: a pellet entry conveyor (1) for delivering pellets to a pellet cyclone separator (2). From the separator, the pellets are fed by a cyclone rotary feeder (3) into a pellet heater (5), and monitored by a pellet heater hydrocarbon detector (4). Next, upon exiting the heater, the pellets may be moved via a rotary feeder (6) into a pellet degasser and holding vessel (8), and again be monitored by a hydrocarbon detector (7). When the system includes a cooling vessel (10), another rotary feeder (9) may be used transport the pellets to the pellet cooler (10). Finally, the cooled pellets may exit the cooler (10) via another rotary feeder (11), unto a cooled Pellet conveyor (12), which transports the treated higher bulk density pellets to further processing steps, if necessary, such as molding, extruding or forming the pellets into an desired article.

In various embodiment, the system may include the use of any number of blowers or fans, such as a degasser and holding vessel purge gas blower or fan (13), a cooled Pellet conveyor blower (14), a thermal oxidizer off gas booster blower or fan (15), and a thermal oxidizer combustion air feed blower (17). With regard to the thermal oxidizer (16) shown in FIG. 1, it is clear that the volatile materials generated in either the heater (5) or the degasser vessel (8) can be directly or indirectly connected to the thermal oxidizer (16), via an off gas filter (18).

A system according to one embodiment of the present disclosure may also include various purge gases, and inlets for the same. For example, FIG. 1 exemplifies a pellet heater purge gas (19), as well as a degasser and holding vessel purge gas line (20).

Finally, FIG. 1 exemplifies the thermal oxidizer exhaust (22) and thermal oxidizer fuel (23).

As shown, in one embodiment, the system described herein may have at least one feeder located between (a) and (b), or between (b) and (c), such as a cyclone rotary feeder.

In another embodiment, the system described herein further comprises an extruder located before the apparatus in (a). In this embodiment, the apparatus for introducing the pellets to the vessel comprises a conveyor belt located between the extruder and the vessel.

In yet another embodiment, the system described herein may further comprise a pellet degasser vessel located downstream of the heater/holding vessel. For example, if the system comprises a cooling vessel, the degasser would be located between the holding vessel and cooling vessel.

In one embodiment, the foregoing monomers, oligomers, waxes, or produced oxidations products and foregoing volatile materials are removed to a level sufficient to improve the odor or taste, or combinations thereof, of the pelletized polyolefin resin.

It is also possible to produce high bulk density pellets by making the pellets very small. In one embodiment, the pellets made according to the present disclosure were nominally ⅛" diameter pellets; however, it is possible to make pellets that have a diameter about 10% of this diameter.

In one embodiment, the present disclosure is directed to a method for making bimodal polyolefin resins having improved bulk density properties. This embodiment is consistent with those previously described herein, in that the method comprises: a heating step, a residence time/holding step, a safety purging step, and an optional cooling step, wherein waste gases generated by this process may be further treated by a thermal destruction processes.

Without being bound by any theory, it is believed that the pellet bulk density is improved by heat treatment of the pellets to adjust the surface properties, a process that anneals the polymer by holding it at an elevated temperature for a prescribed length of time. The pellets have an individual resin density, also referred to as an initial bulk density, which is determined previously by the reaction manufacturing process before the pellets get to the pellet bulk density improver. This bulk density improver process relates to the solids bulk density as in a sample of pellets placed in container of known volume and then weighed.

The upstream extrusion process typically employed to produce the pellets is not designed to provide the conditions needed for annealing of the polymer pellets. As described in literature, pellets in the extrusion section are usually kept below the temperatures needed for bulk density improvement. As described herein, the pellet heater raises the polymer pellet temperature to a level just below the softening point of plastic pellets. The softening point for plastic, also called the Vicat softening point, is determined by measuring the temperature at which a flat ended needle penetrates a specimen by 1 mm and is used to determine softening temperatures when a plastic is used at elevated temperatures. The pellets are held at that elevated temperature for a time of approximately, for example, 10-15 hours, and then cooled down to provide safe conveying conditions. By keeping the pellets at elevated temperature for a minimum hold time, the polymer molecules are allowed to relax more thus changing the pellet size enough to increase their bulk density. The increase in bulk density may also result in a change in surface coefficient of friction such that the pellets are able to pack more tightly.

The purging step assures there is no unsafe condition in the heater and in the holding vessel. In the absence of this step, the materials evolved in the heating step can cause an unacceptably high level of combustible hydrocarbons to be present in the headspace of the processing equipment and thus cause flammable or explosive condition to exist. Purging can be done with air or any other non-hydrocarbon gas, such as nitrogen.

The optional cooling step further facilitates handling of the pellets either in pellet conveying or in packaging functions. In certain circumstances, if left in the heated condition, there may be problems in handling the pellets such as angel hair creation in pneumatic conveying, a phenomenon well-known in the art. However, the optional cooling step depends on the specific processing method utilized after the temperature holding step.

As previously indicated, for environmental reasons, it is becoming more important to be able to process and treat the purge gas (from the purging step) due to the presence of oligomers or small amounts of residual hydrocarbons. This can be done by sending these gases to a flare or a thermal oxidizer. The thermal oxidizer allows for the use of air as the source for the purge gas. The alternative method, a flare, requires a purge gas that is oxygen-free.

In one embodiment, the piping that is used to transport the purge gases to the combustion device should be heat-traced and/or insulated to prevent the deposit of heavy oligomers or hydrocarbons on the pipe walls. Heat tracing can be done with either steam or electricity, but electric allows for more precise temperature control. In addition, a mechanism to filter the purge gas effluent may be installed to eliminate fine contaminants such as small pellets that are carried overhead by the purge gas. Finally, the gases are sent to a thermal oxidizer to combust the purge gas and safely destroy any levels of oligomers or hydrocarbons. Depending upon the pressure of the purge gas, it might be necessary to install a booster fan or blower before the thermal oxidizer to develop the head pressure needed to feed into the combustion device.

Also provided is an enhancement to known processes used in pellet treatment for target applications, such as those described in WO04039848A1; WO 02088194A1 and U.S. Pat. No. 7,232,878 B2, the disclosures of which are incorporated by reference herein. Therefore, the process described herein further provides, in addition to those described above, additional benefits to the resin manufacturer, as well as the resin consumer.

With respect to modifying the bulk density of the pellets, the pellet heater is one important part of the process and system because heat is the driving force for altering the bulk density of the pellets. The pellets are heated to provide an environment suitable for the polymer to come to a new pellet packing density. The heater must be able to provide enough heat economically and to prevent agglomeration of the polymer. Steam or hot water may be used to provide the heat to the pellets. The use of for instance, hot air to heat up the pellets is also possible but it tends to be energy intensive and it can cause problems handling large quantities of hydrocarbon-contaminated purge gas.

Once heated, and in the case of modifying the bulk density of the pellets, the pellets must be maintained at the elevated temperature to allow the polymer molecules to relax. This may be done by letting the pellets reside in a holding vessel or transferring them to a separate degasser vessel. Regardless of which vessel the pellets are maintained in, the vessel capacity is based on the process flow rate of pellets in order to achieve the correct 4-18 hour residence time. In one embodiment, pellets in the heater and/or degasser vessel(s) must be purged continuously with a stream of gas to prevent the accumulation of an explosive atmosphere. Because the purging step sweeps away low levels of oligomers and hydrocarbons, and such materials are not allowed to be released into the atmosphere, it may be necessary to remove or destroy these materials, such as with a thermal oxidizer. Other options for doing this include burning the gaseous stream in a flare provided the purge gas does not contain oxygen. If it contains oxygen, then a thermal oxidizer may be utilized.

The pellet cooler could be modified to use a cool air purge instead of a cooling water exchanger.

The heater design must take into account the maximum temperature limits of the polymer being heated. For example, in the case of bimodal polyethylene, this limit is close to the Vicat softening point or about 211° F. and the temperature limit of the heating medium is also limited. The pellets should not be heated higher than this temperature to avoid complications such as melting or agglomeration of the pellets. If it is steam, the maximum steam temperature for heating bimodal polyethylene is 235° F. It is appreciated that there must be a means of controlling the temperature of the heated pellets and maintaining that temperature over the duration of the hold time.

EXAMPLES

Example 1

Bimodal Polyethylene Pellets Maintained at One Temperature

Figure 3:
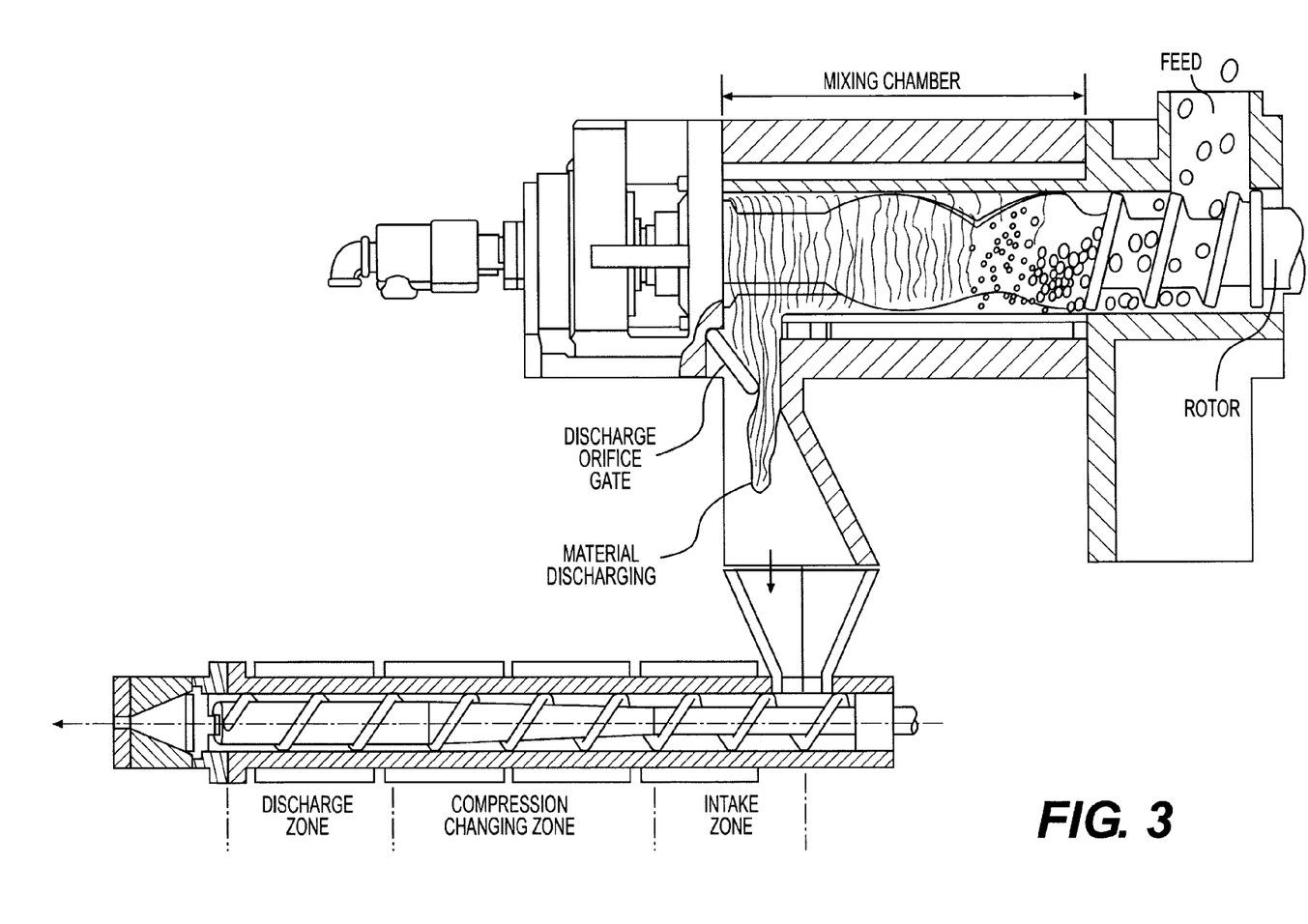
FIG. 3 is a schematic of a Farrel Continuous Mixer used in the present disclosure.

In one example, bimodal polyethylene pellets were produced on a Farrel Continuous mixer compounding line. The Farrel Continuous Mixer used in this example was: (1) a twin rotor mixing device with dissimilar rotors turning at different speeds, one speed approximately 10-15% slower than the other; (2) was an adjustable restrictive device or orifice capable of adjustment while running; (3) was a melt pressurization device such as an extruder which conveyed the melt and provided pressure; and (4) was a melt feed stuffer to push the melt into the extruder flights. The attached FIG. 3 shows schematically a Farrel Continuous Mixer used in the process according to the invention. These pellets were then fed into the apparatus shown in FIG. 1, and described herein. The bimodal pellets leaving the compounder had an initial bulk density of 35.0 lb$^3$, below the desired minimum bulk density of 36.0 lb/ft$^3$. The pellets were then treated in the apparatus at 205 degrees Fahrenheit (F), resulting in a final bulk density of 37.3 lb/ft$^3$. These results are tabulated in Table 1 below.

TABLE 1

| Pellet Treatment Temperature (F.) | Average Inlet Bulk Density (lb/ft$^3$) | Average Outlet Bulk Density (lb/ft$^3$) |
| --- | --- | --- |
| 205 | 35.0 | 37.3 |

Example 2

Bimodal Polyethylene Maintained at Various Temperatures

Figure 2:
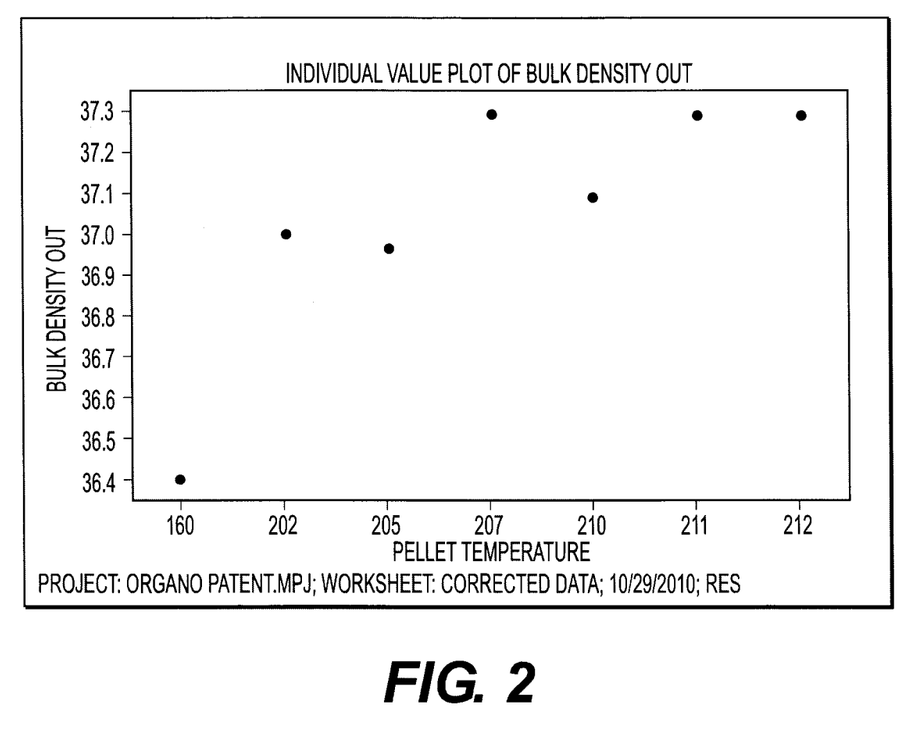
FIG. 2 is a graph of final bulk density vs. pellet temperature for sample made according to the present disclosure.

In another example, bimodal polyethylene pellets were produced on a Farrel Continuous mixer compounding line, as described in Example 1. These pellets were then fed into the apparatus shown in FIG. 1. The pellet treatment temperature in the apparatus was varied between 160° F. and 212° F. The 160° F. was chosen because that is the unheated temperature of the pellets as they exited the pelletizer on the extruder. Samples were taken of the pellets entering the heater and of pellets exiting the cooler to measure the change in bulk density. The data is presented below in Table 2, and graphically represented in FIG. 2.

TABLE 2

| Pellet Temperature (° F.) | Average Inlet Bulk Density (lb/ft³) | Average Outlet Bulk Density (lb/ft³) |
| --- | --- | --- |
| 160 | 36.4 | 36.4 |
| 202 | 36.5 | 37.0 |
| 205 | 35.9 | 37.0 |
| 207 | 36.3 | 37.3 |
| 212 | 36.4 | 37.3 |

Example 3

Tailoring the Level of Oligomers in Bimodal Polyethylene by Adjusting Pellet Temperatures while Keeping the Residence Time Constant In another example, bimodal polyethylene pellets were produced on a Farrel Continuous mixer compounding line, as described in Example 1. These pellets were then fed into the apparatus shown in FIG. 1. The pellet temperature in the apparatus was varied while keeping the residence time constant at each temperature. Samples of the pellets were taken before and after the apparatus to measure the modification of the oligomers level in the resin. For the purposes of this example the residence time was maintained at twelve hours.

TABLE 3

| Pellet Temperature (F.) | Inlet Average C6-C10 Oligomer Level (ppm) | Outlet C6-C10 Oligomer Level (ppm) |
| --- | --- | --- |
| 160 | 262 | 69 |
| 193 | 262 | 32 |
| 205 | 262 | 18 |
| 211 | 262 | 16 |

Example 4

Modifying the Taste and Odor Properties of the Resin

In another example, monomodal polyethylene pellets were produced on a Farrel Continuous mixer compounding line, as described in Example 1. These pellets were then fed into the apparatus shown in FIG. 1. The pellets in the apparatus were heated to a hold temperature of 200 degrees Fahrenheit (F). The residence time was held constant at twelve hours. Samples of the pellets were taken after the apparatus and tested for a taste profile on a scale of one to four (one being good taste or low odor and four being poor taste and high odor). The lower score of the treated pellets (as compared to the untreated pellets) indicates that the apparatus improved the taste and odor profile of the resin.

TABLE 4

|  | Untreated Pellets | Treated Pellets 180° F. | Treated Pellets, 200° F. Case 1 | Treated Pellets, 200° F. Case 2 |
| --- | --- | --- | --- | --- |
| Taste (Scale of 1-4) | 3.7 | 3.0 | 2.3 | 2.5 |
| Average (C2-C8) Oligomers ppm | 132 | 13.9 | 1.34 | 0.82 |

Notwithstanding that the numerical ranges and parameters setting forth the broad scope of the disclosure are approximations, unless otherwise indicated the numerical values set forth in the specific examples are reported as precisely as possible. Any numerical value, however, inherently contains certain errors necessarily resulting from the standard deviation found in their respective testing measurements.

Other embodiments of the devices and methods described herein will be apparent to those skilled in the art from consideration of the specification and practice. It is intended that the specification and examples be considered as exemplary only, with the true scope of the devices and methods described being indicated by the claims.

1. Pellet entry conveyor
2. Pellet cyclone separator
3. Cyclone rotary feeder
4. Pellet heater Hydrocarbon detector
5. Pellet heater
6. Pellet heater rotary feeder
7. Pellet degasser and holding vessel Hydrocarbon detector
8. Pellet degasser and holding vessel
9. Pellet degasser and holding vessel rotary feeder
10. Pellet cooler
11. Pellet cooler rotary valve
12. Cooled Pellet conveyor
13. Degasser and holding vessel purge gas blower or fan
14. Cooled Pellet conveyor blower
15. Thermal oxidizer off gas booster blower or fan
16. Thermal oxidizer
17. Thermal oxidizer combustion air feed blower
18. Off gas filter
19. Pellet heater purge gas
20. Degasser and holding vessel purge gas
21. Treated higher bulk density pellets to further processing
22. Thermal oxidizer exhaust
23. Thermal oxidizer fuel

What is claimed is:

1. A method of making a pelletized polyolefin resin comprising:
    introducing pellets comprising polyolefins to a vessel, wherein said pellets comprise at least one bimodal or multi-modal olefin polymer, and further wherein the initial bulk density of the pellets is lower than 37 lb/ft³;
    pre-heating the pellets in said vessel to a hold temperature greater than 200° F.;
    maintaining the pellets at said hold temperature in a holding vessel, wherein the holding vessel has at least one port for removing volatile materials generated from the pellets;
    cooling the pellets below said hold temperature in a cooling vessel;
    purging the holding vessel of volatile materials; and
    treating the purged volatile materials by exposing them to at least one thermal destruction process,
    wherein the pellets are maintained at the hold temperature for a time sufficient to increase the bulk density of said pellets above 37 lb/ft³, and wherein the pellets are heated with steam or hot water and further wherein the cooled pellets have an average nominal diameter ranging from 0.05 to 0.35 inches.

2. The method of claim 1, further comprising at least one processing step to form said resin into an article that will come into contact with food or water.

3. The method of claim 2, wherein said article comprises a cap, closure, bottle, pipe, film, or container.

4. The method of claim 1, wherein said olefin polymer is chosen from ethylene, propylene, methylpentene, hexene-1, and butene-1.

5. The method of claim 4, wherein said olefin polymer is bimodal.

6. The method of claim 1, wherein the hold temperature ranges from greater than 200 up to 330° F.

7. The method of claim 1, wherein the pellets are maintained at said hold temperature for a time ranging from 4-18 hours.

8. The method of claim 7, wherein the pellets are maintained at said hold temperature for a time ranging from 10-15 hours.

9. The method of claim 1, wherein said cooling is performed until the pellets reach room temperature.

10. The method of claim 1, wherein said cooling is performed using a cool gas purge or a cool water exchanger.

11. The method of claim 1, wherein purging the holding vessel of the volatile materials is done with air, fuel gas, or a non-hydrocarbon gas.

12. The method of claim 11, wherein the non-hydrocarbon gas comprises nitrogen.

13. The method of claim 1, wherein the at least one thermal destruction process comprises passing the volatile materials through a flare or thermal oxidizer.

14. The method of claim 2, wherein said at least one additional processing step that forms said pellets into an article comprises extrusion, injection molding, blow molding, thermoforming, or rotomolding.

* * * * *